(12) United States Patent  
Ludtka et al.

(10) Patent No.: US 8,729,996 B2  
(45) Date of Patent: May 20, 2014

(54) MITIGATED-FORCE CARRIAGE FOR HIGH MAGNETIC FIELD ENVIRONMENTS

(75) Inventors: Gerard M. Ludtka, Oak Ridge, TN (US); Gail M. Ludtka, Oak Ridge, TN (US); John B. Wilgen, Oak Ridge, TN (US); Bart L. Murphy, Friendsville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 203 days.

(21) Appl. No.: 13/329,373

(22) Filed: Dec. 19, 2011

(65) Prior Publication Data

US 2013/0089401 A1 Apr. 11, 2013

Related U.S. Application Data

(60) Provisional application No. 61/543,984, filed on Oct. 6, 2011.

(51) Int. Cl.
*H01F 13/00* (2006.01)
*H01F 7/02* (2006.01)
*H01F 1/153* (2006.01)

(52) U.S. Cl.
CPC .............. *H01F 13/003* (2013.01); *H01F 13/00* (2013.01); *H01F 13/006* (2013.01); *H01F 7/0242* (2013.01); *H01F 1/15341* (2013.01)
USPC ......................................................... 335/284

(58) Field of Classification Search
CPC ..... H01F 13/00; H01F 13/003; H01F 7/0242; H01F 1/15341; H01F 41/02; H01F 13/006; B22F 2202/05
USPC .................. 335/284–295; 414/749.2; 148/108
See application file for complete search history.

(56) References Cited

U.S. PATENT DOCUMENTS

| | | | |
|---|---|---|---|
| 6,182,954 B1 * | 2/2001 | Zhang | ................................ 269/7 |
| 6,773,513 B2 | 8/2004 | Kisner et al. | |
| 7,161,124 B2 | 1/2007 | Kisner et al. | |
| 7,745,765 B2 | 6/2010 | Ludtka et al. | |
| 8,470,721 B2 * | 6/2013 | Ashkenazi | ..................... 438/800 |
| 2011/0220249 A1 | 9/2011 | Bogicevic et al. | |

* cited by examiner

*Primary Examiner* — Bernard Rojas
(74) *Attorney, Agent, or Firm* — Joseph A. Marasco

(57) ABSTRACT

A carriage for high magnetic field environments includes a first work-piece holding means for holding a first work-piece, the first work-piece holding means being disposed in an operable relationship with a work-piece processing magnet having a magnetic field strength of at least 1 Tesla. The first work-piece holding means is further disposed in operable connection with a second work-piece holding means for holding a second work-piece so that, as the first work-piece is inserted into the magnetic field, the second work-piece is simultaneously withdrawn from the magnetic field, so that an attractive magnetic force imparted on the first work-piece offsets a resistive magnetic force imparted on the second work-piece.

12 Claims, 12 Drawing Sheets

US 8,729,996 B2

MITIGATED-FORCE CARRIAGE FOR HIGH MAGNETIC FIELD ENVIRONMENTS

CROSS REFERENCE TO RELATED APPLICATIONS

This application claims priority to U.S. Provisional Application No. 61/543,984, filed on Oct. 6, 2011, which is incorporated herein in its entirety by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

BACKGROUND OF THE INVENTION

High magnetic field processing of materials is of great interest, especially in the processing of certain alloys, to achieve superior properties and characteristics. Work-pieces of materials are passed in and out of high magnetic fields to affect the properties and characteristics of the processed materials. Such processes and associated apparatus are well known; see for example; U.S. Pat. No. 7,745,765 issued on Jun. 29, 2010 to Ludtka, et al. entitled "Thermal and High Magnetic Field Treatment of Materials and Associated Apparatus"; U.S. Pat. No. 7,161,124 issued on Jan. 9, 2007 to Kisner, et al. entitled "Thermal and High Magnetic Field Treatment of Materials and Associated Apparatus"; and U.S. Pat. No. 6,773,513 issued on Aug. 10, 2004 to Kisner, et al. entitled "Method for Residual Stress Relief and Retained Austenite Destabilization".

A high magnetic field environment generally comprises a uniform maximum magnetic field region surrounded by a gradient magnetic field region. When a ferromagnetic material is either inserted into or removed from a high magnetic field region, the magnetic field gradient region imparts a significant force which must be overcome in order to move the material into or out of position. For example, low carbon steel in a 9 Tesla superconducting magnet with a gradient scale length of ⅙ meter is generally subject to an attractive magnetic force of 280 lbs. per cubic inch of steel. Therefore, to insert and/or remove a relatively large work-piece into a high magnetic field region such as a thermomagnetic processing device, the work-piece can experience forces on the order of hundreds to thousands of pounds. Such resistive force makes work-piece insertion and/or removal a potentially difficult task.

The high resistive force issue is a negative driving force for carriage (work-piece handling and/or transport system) design that requires very large and cumbersome framework to overcome the high forces that are imparted upon the work-piece during insertion and removal processes. It is desirable to mitigate such resistive forces in a magnetic field environment to facilitate ease of work-piece loading, in many cases for magnets having as little as 1 Tesla.

BRIEF SUMMARY OF THE INVENTION

In accordance with some examples of the present invention, a carriage for high magnetic field environments that includes a first work-piece holding means for holding a first work-piece, the first work-piece holding means being disposed in an operable relationship with a work-piece processing magnet having a magnetic field strength of at least 1 Tesla. The first work-piece holding means is further disposed in operable connection with a second work-piece holding means for holding a second work-piece so that, as the first work-piece is inserted into the magnetic field, the second work-piece is simultaneously withdrawn from the magnetic field, so that an attractive magnetic force imparted on the first work-piece offsets a resistive magnetic force imparted on the second work-piece.

In accordance with other examples of the present invention, a dual stage carriage for high magnetic field environments includes a primary traversing frame disposed in an operable relationship with a work-piece processing magnet having a magnetic field strength of at least 1 Tesla, the primary traversing frame further disposed in operable connection with a first work-piece holding means for holding a first work-piece; and a secondary traversing frame supported by the primary traversing frame and disposed in operable connection to a second work-piece holding means for holding a second work-piece. With the second work-piece in the magnetic field, the first work-piece can be moved from a position essentially outside effective bounds of the magnetic field toward the second work-piece to a preselected spacing from the second work-piece, then, as the first work-piece holding means is inserted into the magnetic field, the second work-piece holding means is simultaneously withdrawn from the magnetic field, so that an attractive magnetic force imparted on the first work-piece offsets a resistive magnetic force imparted on the second work-piece, and then, with the first work-piece being within the magnetic field, the second work-piece can be moved from the preselected spacing from the first work-piece away from the first work-piece to a position essentially outside the effective bounds of the magnetic field.

In accordance with other examples of the present invention, a carriage for high magnetic field environments includes a plurality of work-piece separators disposed in an operable relationship with a work-piece processing magnet having a magnetic field strength of at least 1 Tesla for supporting and separating a plurality of work-pieces by a preselected, essentially equal spacing. As a first work-piece is inserted into the magnetic field, a second work-piece is simultaneously withdrawn from the magnetic field, so that an attractive magnetic force imparted on the first work-piece offsets a resistive magnetic force imparted on the second work-piece.

In accordance with other examples of the present invention, a carriage for high magnetic field environments includes a continuous, looped, flexible, work-piece holding conveyor disposed in an operable relationship with a work-piece processing magnet having a magnetic field strength of at least 1 Tesla, the conveyor defining a plurality of essentially equally spaced work-piece holding positions. As the conveyor moves a first work-piece into the magnetic field, the conveyor also simultaneously withdraws a second work-piece from the magnetic field, so that an attractive magnetic force imparted on the first work-piece offsets a resistive magnetic force imparted on the second work-piece.

In accordance with further examples of the present invention, a method of moving work-pieces into and out of a high magnetic field environment includes the steps of: providing a first work-piece holding means that is holding a first work-piece and a second work-piece holding means that is holding a second work-piece, the first work-piece holding means being disposed in operable connection with the second work-piece holding means; with the first work-piece holding means, holding the first work-piece disposed without a magnetic field having strength of at least 1 Tesla while, with second work-piece holding means, holding the second work-piece disposed within the magnetic field; and moving the first work-piece holding means and the second work-piece holding means to simultaneously insert the first work-piece into the magnetic field and withdraw the second work-piece from the magnetic field, so that an attractive magnetic force imparted on the first work-piece offsets a resistive magnetic force imparted on the second work-piece.

In accordance with still further examples of the present invention, a method of moving work-pieces into and out of a high magnetic field environment includes the steps of: providing a primary traversing frame disposed in an operable relationship with a work-piece processing magnet having a magnetic field strength of at least 1 Tesla, the primary traversing frame further disposed in operable connection with a first work-piece holding means that is holding a first work-piece, and a secondary traversing frame supported by the primary traversing frame and disposed in operable connection to a second work-piece holding means that is holding a second work-piece; with the second work-piece in the magnetic field, moving the first work-piece from a position essentially outside effective bounds of the magnetic field toward the second work-piece to a preselected spacing from the second work-piece; as the first work-piece is inserted into the magnetic field, simultaneously withdrawing the second work-piece from the magnetic field while maintaining the preselected spacing, so that an attractive magnetic force imparted on the first work-piece offsets a resistive magnetic force imparted on the second work-piece; and with the first work-piece being within the magnetic field, moving the second work-piece from the preselected spacing from the first work-piece away from the first work-piece to a position essentially outside the effective bounds of the magnetic field.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention provides a work-piece handling system (hereinafter called a carriage) that is disposed in an operable relationship with a work-piece processing magnet having a magnetic field strength of at least 1 Tesla. The carriage is preferably made of nonmagnetic material and/or is of sufficiently strong construction to not be bent, warped, or otherwise misshapen by the magnetic field. The carriage holds and simultaneously moves both the work-piece and a counter-work-piece in and out of a magnetic field gradient region. The counter-work-piece is subjected to a generally opposing and optimally equal force due to the magnetic field gradient region where the work-piece is located. Thus, the forces are essentially opposite and therefore at least partially cancel each other out. Work-piece handling equipment can be significantly smaller than conventional equipment because it will not have to be designed to handle extremely high loads as is currently required.

The counter-work-piece can be a second work-piece, or it can be a dummy work-piece. The work-piece and the counter-work-piece should be identical, or at least as similar as possible in order to ensure the closest possible match in the counter directed magnetic forces. The work-piece and the counter-work-piece must be disposed in an operable mechanical connection so that they move simultaneously within the gradient magnetic field while essentially maintaining a preselected spacing therebetween.

Figure 1:
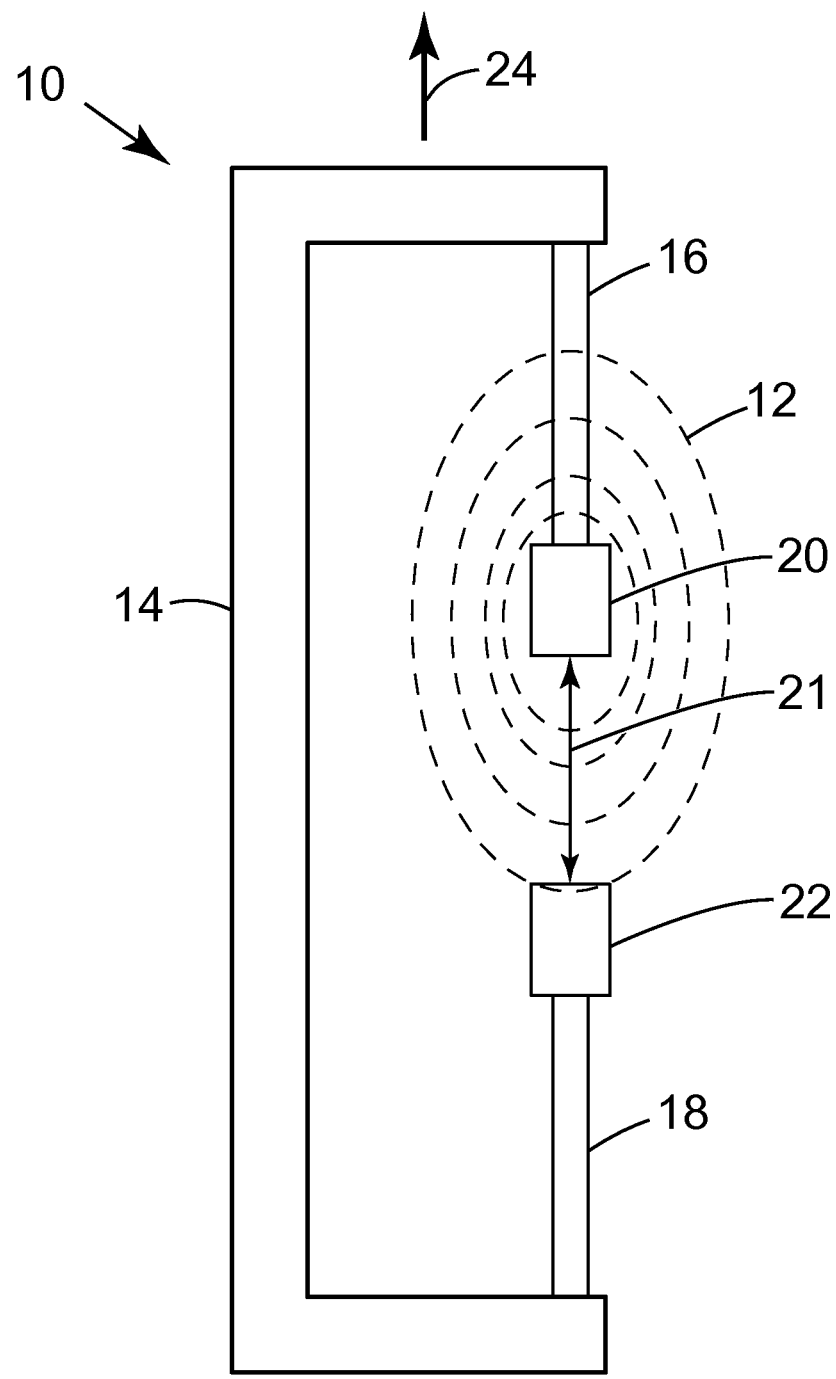
FIG. 1 is a schematic diagram of a single stage carriage in a first position in accordance with an example of the present invention.
Figure 2:
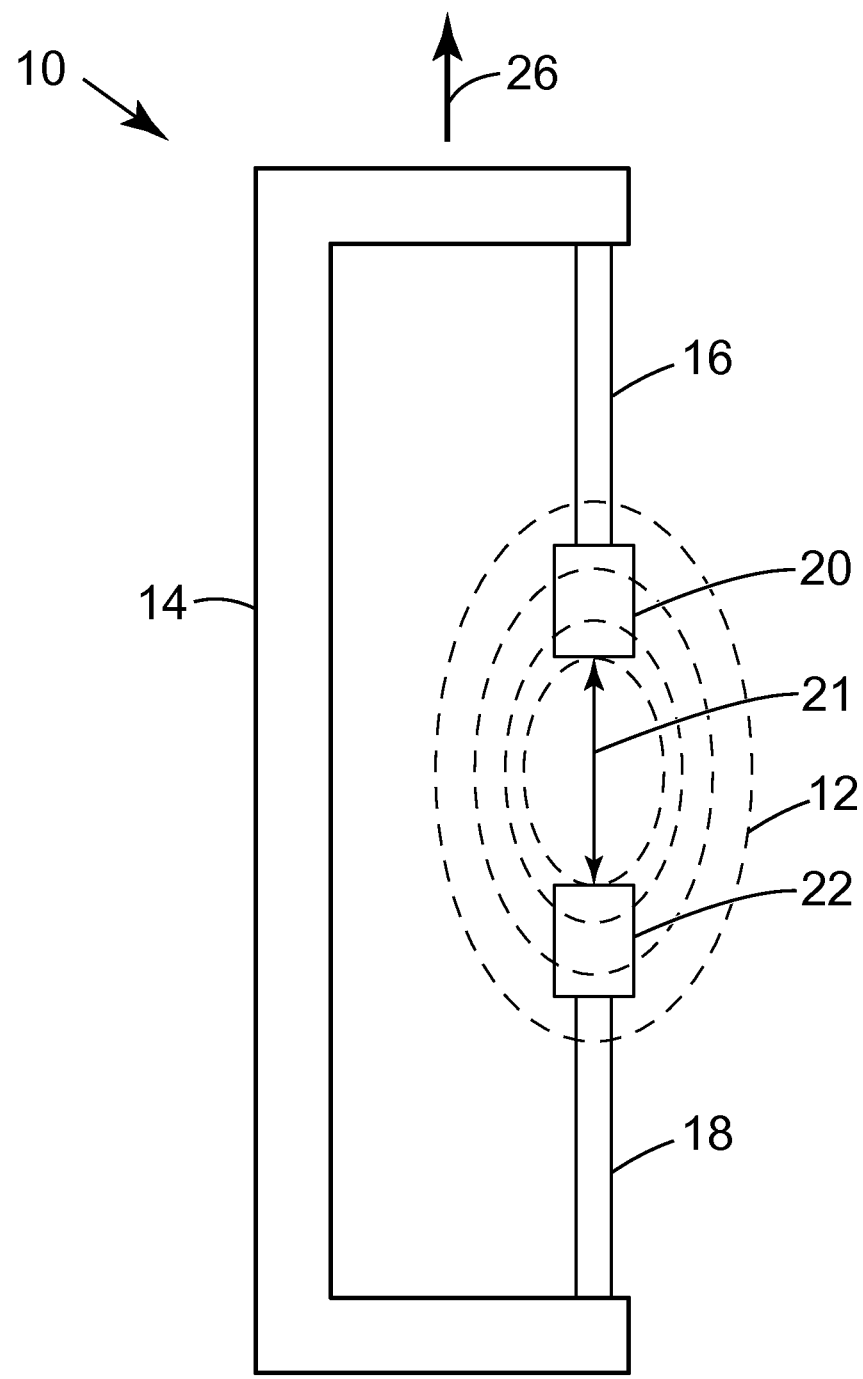
FIG. 2 is a schematic diagram of a single stage carriage in a second position in accordance with an example of the present invention.
Figure 3:
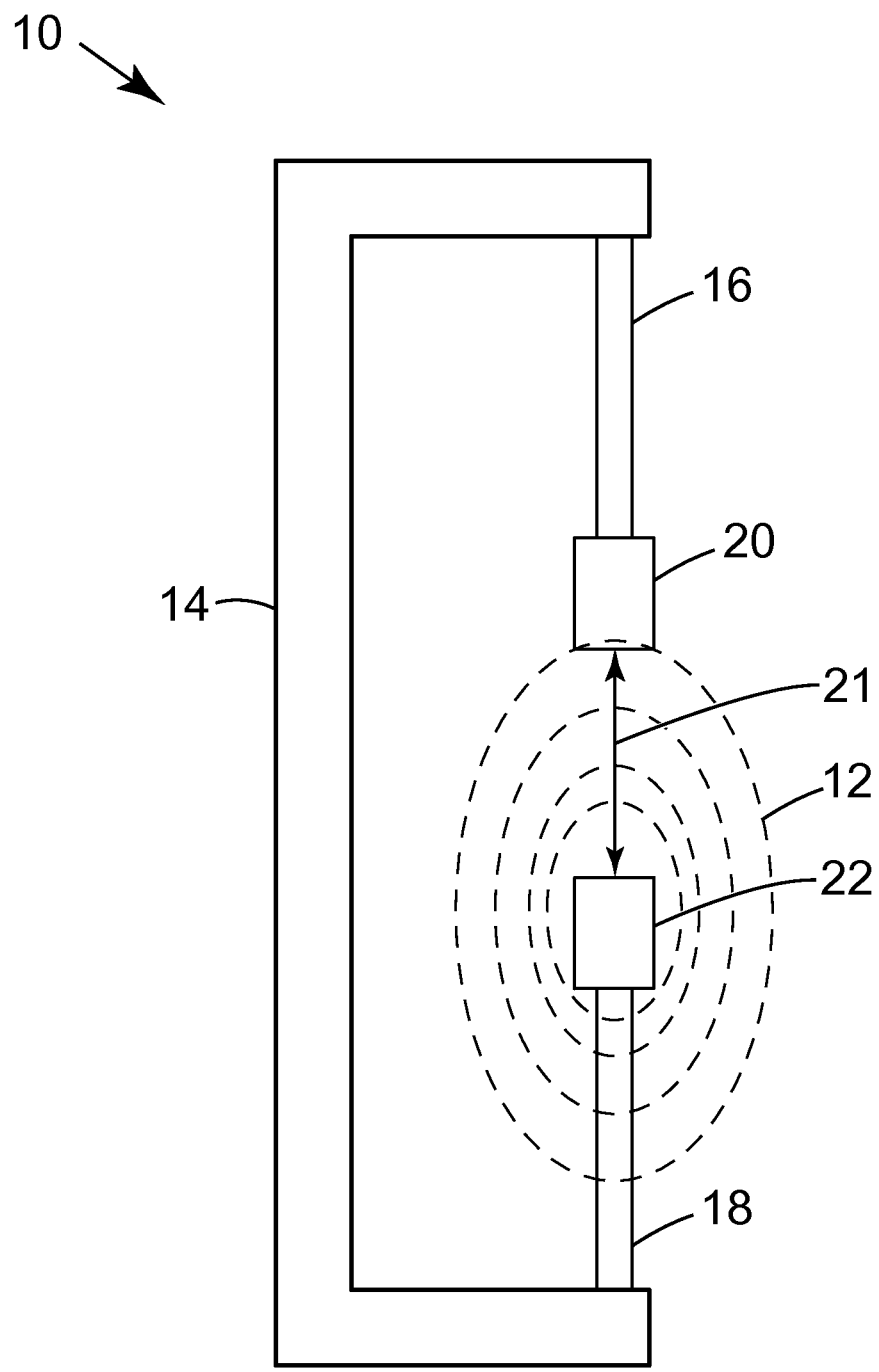
FIG. 3 is a schematic diagram of a single stage carriage in a third position in accordance with an example of the present invention.

An example of a single stage carriage in accordance with the present invention is shown in FIGS. 1-3. A carriage 10 is represented schematically and a magnetic field 12 is represented by a diagram of magnetic field gradient lines, the innermost representing the strongest region of the magnetic field 12. The magnetic field 12 represents a work-piece processing magnet having a field strength of at least 1 Tesla.

The carriage 10 comprises a traversing frame 14, a work-piece holder 16, and a counter-work-piece holder 18. A work-piece 20 and a counter-work-piece 22 are held at a preselected spacing 21 and can be interchangeable. As illustrated, the traversing frame 14 can be disposed essentially outside the effective bounds of the magnetic field 12.

As described hereinabove, the carriage 10 is preferably of sufficiently strong construction to remain essentially rigid when moving work-pieces 20, 22 in and out of the magnetic field 12. The carriage 10 is preferably made of nonmagnetic material. The work-piece holder 16 and the counter-work-piece holder 18 are also interchangeable, preferably nonmagnetic, and can comprise any conventional means for holding a work-piece for insertion into a processing apparatus such as a magnet. Suggested work-piece holding means can include at least one of, (but not limited to) a threaded link, a bolt, a stud, a friction grip, a collet, a chuck, a hook, a latch, a locking pin, a clasp, a snap, a spring, a clamp, a fastener, a wedge, and the like.

In operation, the carriage 10 moves (traverses) in the direction of the arrows 24, 26 from a first position as shown in FIG. 1, through a second position as shown in FIG. 2, and into a third position as shown in FIG. 3. As the work-piece 20 is moved out of the magnetic field 12, the counter-work-piece 22 is simultaneously moved into magnetic field 12 for magnetic processing. During the moving process, attractive magnetic force imparted on the counter-work-piece 22 at least partially offsets a resistive magnetic force imparted on the work-piece 20. Ideally, the attractive magnetic force imparted on the counter-work-piece 22 completely offsets the resistive magnetic force imparted on the work-piece 20, resulting, ideally, in an essentially zero-force movement. Thus, the counter-work-piece 22 assists in the removal of the work-piece 20.

Spacing 21 of the work-pieces 20, 22 is important in carrying out the present invention for optimizing the force offset and thus minimizing the force necessary. Spacing 21 can be adjustable to accommodate various sizes of work-pieces 20, 22. Work-piece holders 16, 18 can be of adjustable length, or can be interchangeable with other work-piece holders (not shown) of different lengths.

The work-piece 20 can be exchanged with a new work-piece when the carriage 10 is in the position shown in FIG. 3. Subsequently the carriage 10 can be moved in the opposite direction, back to the position shown in FIG. 1. The counter-work-piece 22 can be exchanged in that position.

FIGS. 4-7 show various operational positions of a dual stage carriage 30 in accordance with another example of the present invention. A primary traversing frame comprises a pair of anchored primary telescoping arms 32 support a primary cross-member 34. The primary cross-member 34 supports a secondary traversing frame comprising a pair of secondary telescoping arms 36 that support a secondary cross-member 38. The primary cross-member 34 supports a counter-work-piece holder 40 and counter-work-piece 42, and the secondary cross-member 38 supports a work-piece holder 44, and work-piece 46. As illustrated, all of the components of the dual stage carriage 30 except the counter-work-piece holder 40 and the work-piece holder 44 can be disposed essentially outside the effective bounds of the magnetic field 12.

Figure 4:
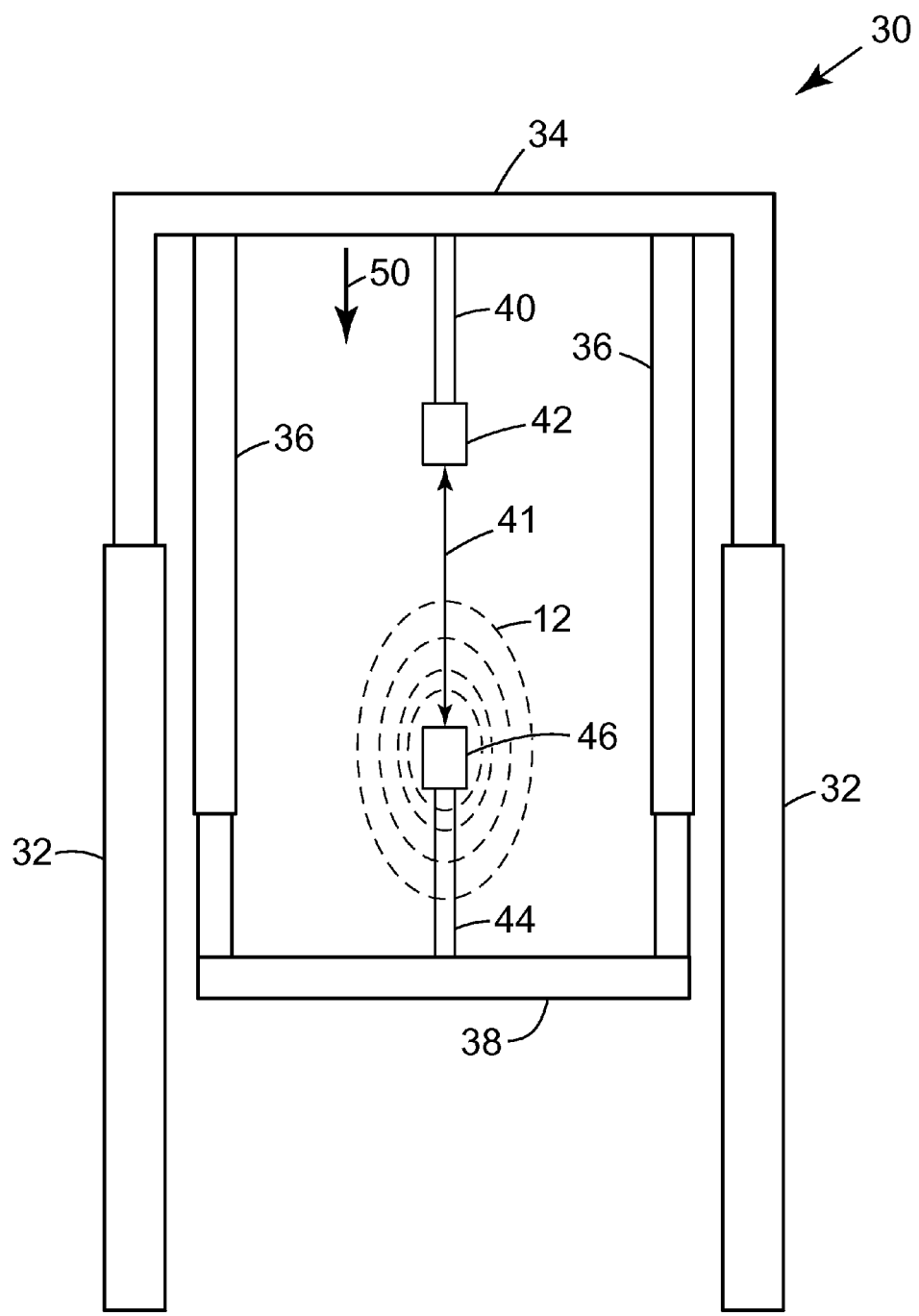
FIG. 4 is a schematic diagram of a dual stage carriage in a first position in accordance with an example of the present invention.

FIG. 4 shows the dual stage carriage 30 in a first operational position wherein the counter-work-piece 42 is accessible and can be replaced if desired. The work-pieces 42, 46 are shown at an initial spacing 41. In a first, compound movement, primary telescoping arms 32 partially retract while the secondary telescoping arms 36 fully retract to move primary cross-member 34 in the direction indicated by arrow 50 to the second operational position shown in FIG. 5. The secondary cross-member 38, work-piece holder 44, and work-piece 46 remain essentially stationary during the first movement. The purpose of the first movement is to move the counter-work-piece 42, into a proximity of the magnetic field 12 without moving the work-piece 46. The work-pieces 42, 46 are shown at a second spacing 43.

Figure 5:
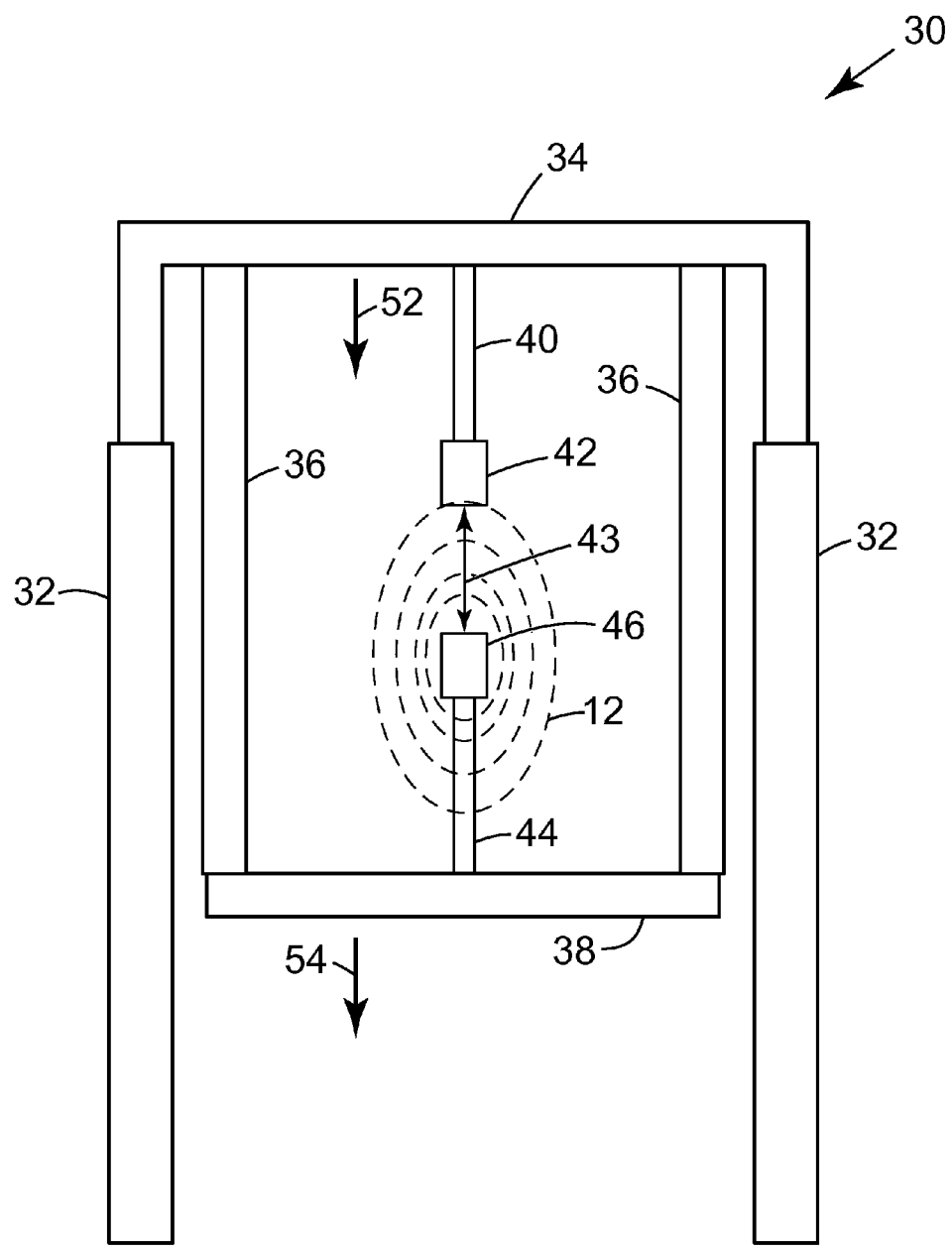
FIG. 5 is a schematic diagram of a dual stage carriage in a second position in accordance with an example of the present invention.
Figure 6:
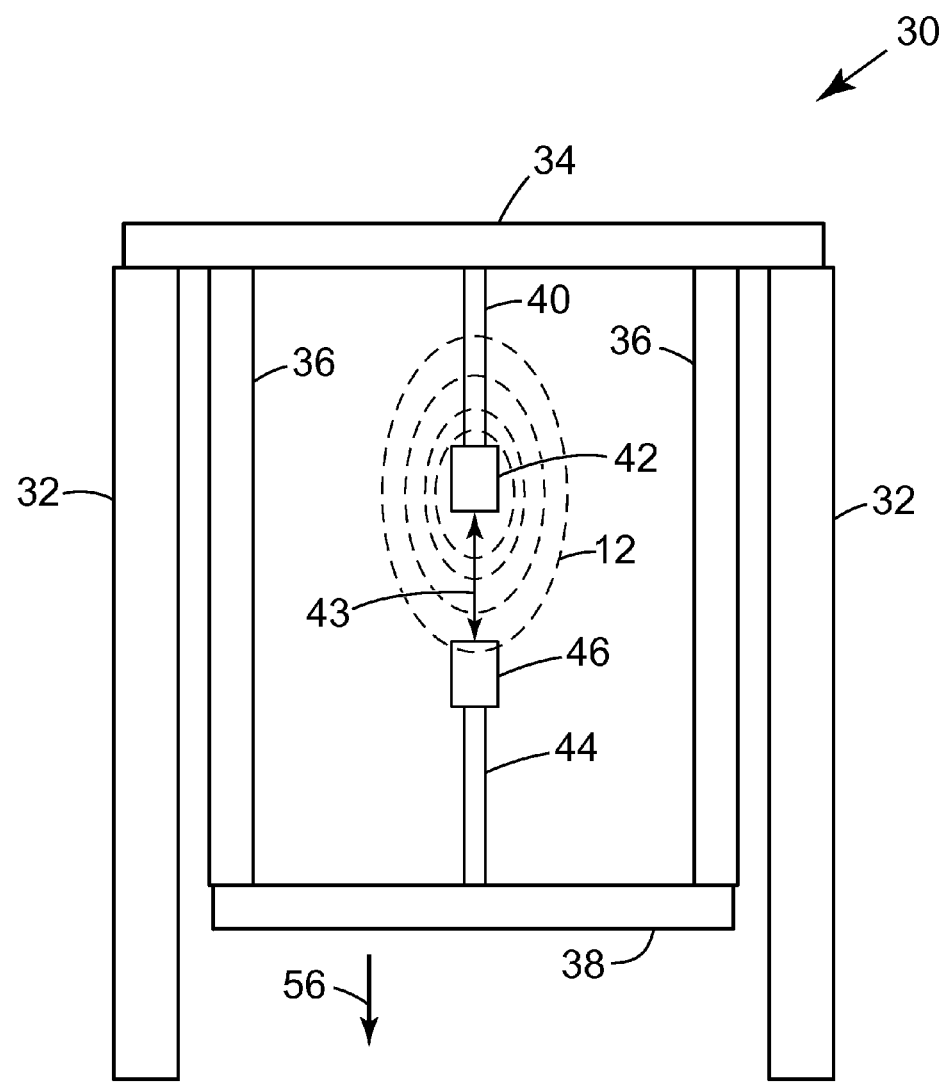
FIG. 6 is a schematic diagram of a dual stage carriage in a third position in accordance with an example of the present invention.

In a second, simple movement, primary telescoping arms 32 fully retract to move primary cross-member 34 in the direction indicated by arrow 52 in FIG. 5 to the third operational position shown in FIG. 6. Since the secondary telescoping arms 36 are already fully retracted, the secondary cross-member 38, work-piece holder 44, and work-piece 46 are simultaneously moved therewith, as indicated by arrow 54 in FIG. 5. The work-pieces 42, 46 remain at the second spacing 43. The purpose of the second movement is to move the counter-work-piece 42 into the magnetic field 12 (optionally for magnetic processing) while simultaneously moving the work-piece 46 out of the magnetic field 12. The counter-work-piece 42 assists in removal of the work-piece 46 as described hereinabove, offsetting magnetic forces.

Figure 7:
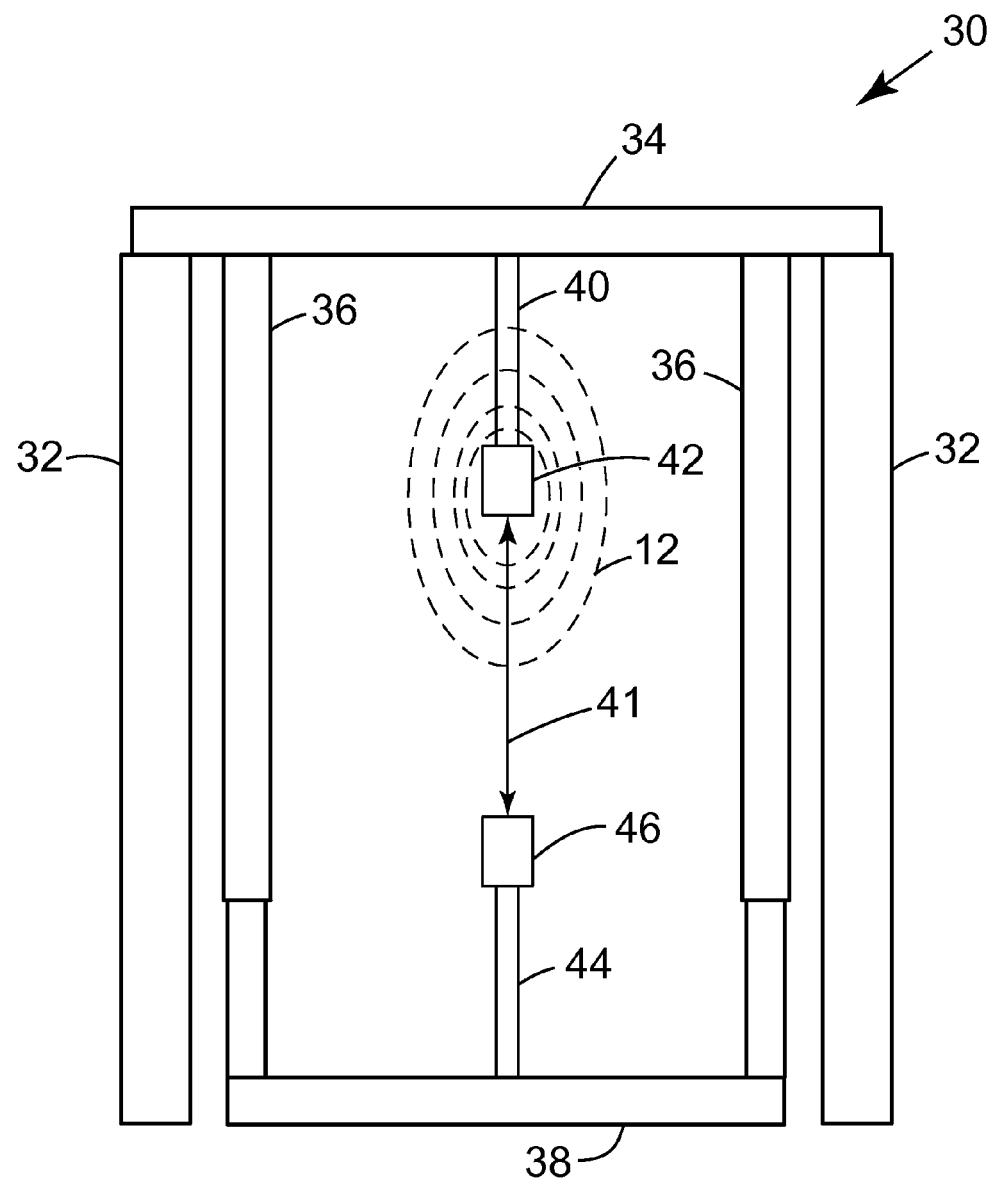
FIG. 7 is a schematic diagram of a dual stage carriage in a fourth position in accordance with an example of the present invention.

In a third, simple movement, the secondary telescoping arms 36 fully extend to move the secondary cross-member 38, work-piece holder 44, and work-piece 46 in the direction indicated by arrow 56 in FIG. 6 to the fourth operational position shown in FIG. 7. The primary cross-member 34, counter-work-piece holder 40, and counter work-piece 42 all remain essentially stationary during the third movement. The purpose of the third movement is to move the work-piece 46, out of a proximity of the magnetic field 12 without moving the counter-work-piece 42. The spacing of work-pieces 42, 46 is restored to the initial spacing 41 shown in FIG. 4. In the fourth operational position the work-piece 46 is accessible and can be replaced if desired.

The movements shown in FIGS. 4-7 can be subsequently repeated in reverse order in order to return the dual stage carriage 30 to the first operational position shown in FIG. 4. Thus, a complete cycle is consummated.

Figure 8:
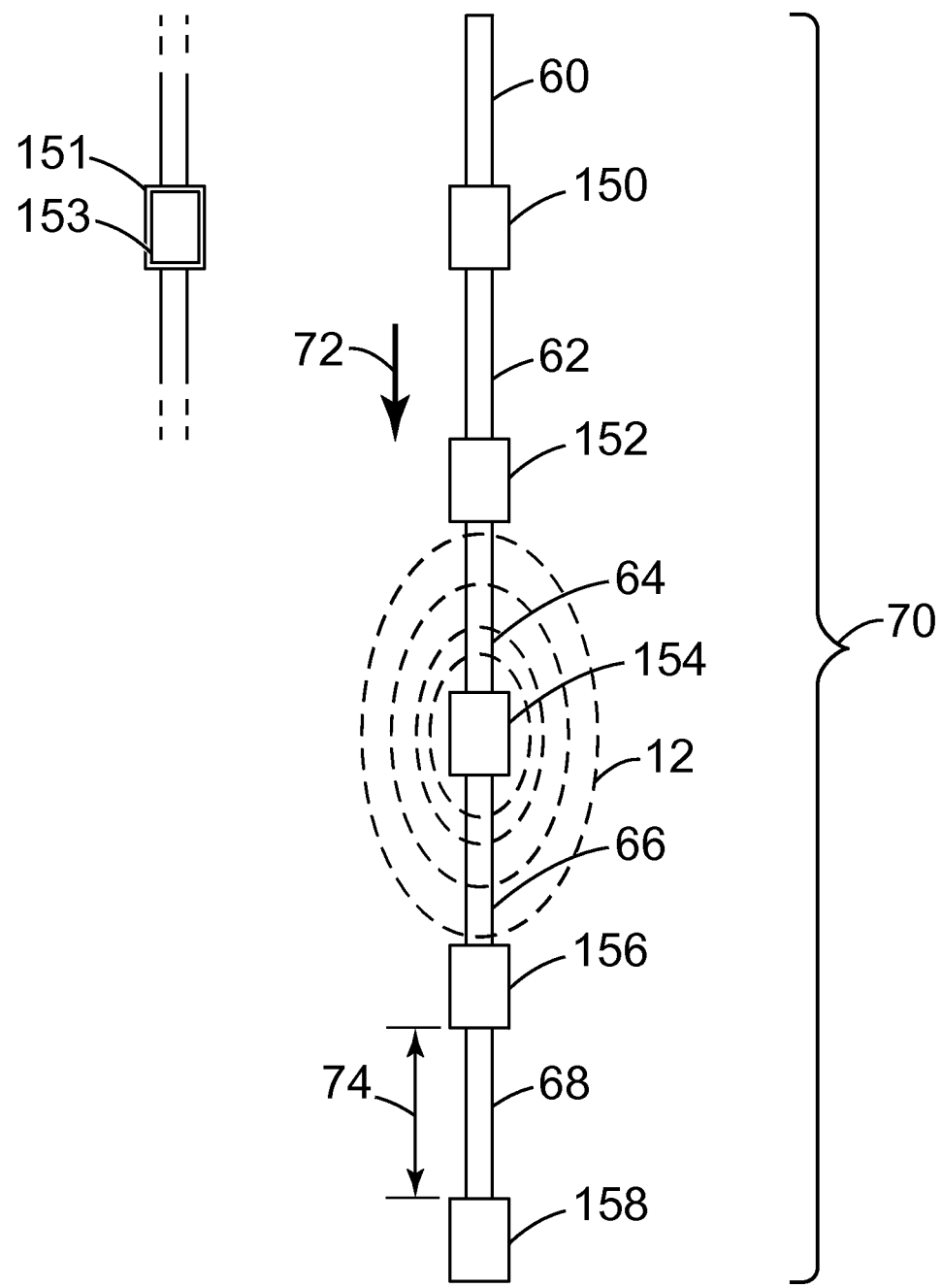
FIG. 8 is a schematic diagram of a carriage configured for continuous straight-line processing in accordance with an example of the present invention.

FIG. 8 shows an example of the present invention configured for continuous straight-line movement of work-pieces through a magnetic field 12, each work-piece acting as a counter-work-piece for the preceding work-piece. In this general illustration, five identical work-pieces 150, 152, 154, 156, 158 are interconnected and supported essentially equidistantly by work-piece separators 60, 62, 64, 66, 68, all of essentially equal, preselected length 74 in the fashion of a chain 70. The work-piece separators 60, 62, 64, 66, 68 in this example are adapted to support a work-piece at each end thereof, separating the work-pieces by preselected, essentially equal spacing. The first work-piece 150 and the work-piece separator 60 comprise a segment of the chain 70, and so on. A chain can be comprised of as few as two work-pieces and two work-piece separators, or as many as is suitable for a particular application.

Also shown in FIG. 8 is an optional arrangement wherein a work-piece 153 is held by work-piece station 151. A work-piece station 151 can be defined as any conventional structure operably connectable to a work-piece separator 60, 62, 64, 66, 68, and adapted for holding a work-piece 153 for processing. A work-piece 153 can be held in a work-piece station 151 by any of the work-piece holding means described hereinabove.

In a unidirectional mode of operation, the chain 70 is moved only in the direction of the arrow 72 the length of one segment. Work-piece 154 is moved out of the magnetic field 12 with the assistance of work-piece 152, which is simultaneously moved into the magnetic field 12 for magnetic processing. Magnetic forces are offset as described hereinabove. Subsequently, the segment comprising last work-piece 158 and the work-piece separator 68 can be removed and separated. Another work-piece can be connected to the work-piece separator 68 and added to the chain 70 above the first work-piece 150 as a new segment, and the above steps are repeated.

Alternatively, the example of the present invention shown in FIG. 8 can be operated in a bidirectional mode, moving the chain 70 alternately in the direction of the arrow 72 and in the opposite direction. Processed work-pieces can be removed and new work-pieces can be added at both ends, in alternating fashion.

Figure 9:
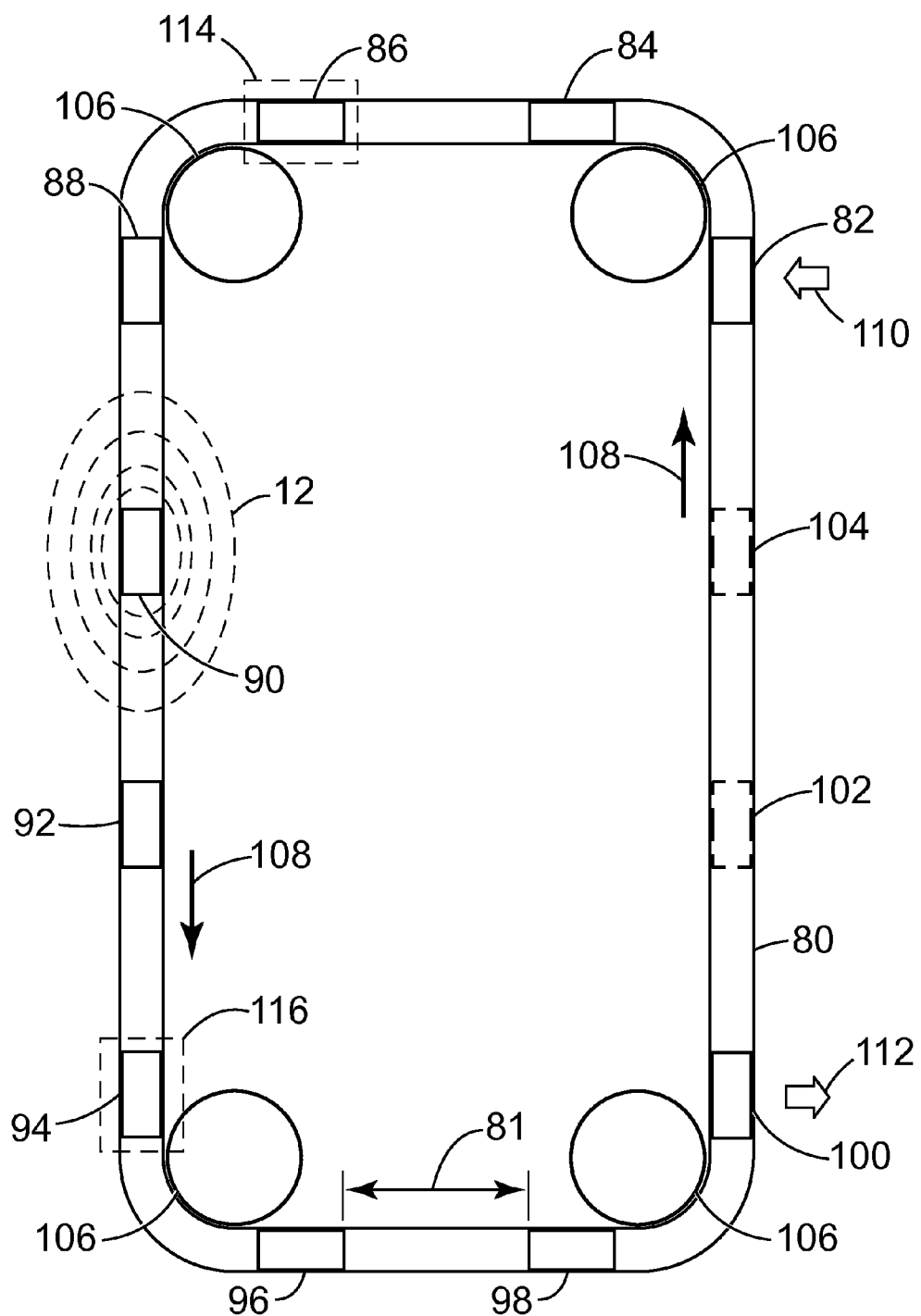
FIG. 9 is a schematic diagram of a carriage configured for continuous loop processing in accordance with an example of the present invention.

FIG. 9 shows an example of the present invention configured for continuous loop processing. Work-pieces move in succession through a magnetic field 12, each work-piece acting as a counter-work-piece for the preceding work-piece. In this general illustration, a continuous, looped, flexible, work-piece holding conveyor 80 may include at least one of a belt and a chain. The 80 has a plurality of essentially equally spaced (represented by dimension 81) work-piece holding positions 82, 84, 86, 88, 90, 92, 94, 96, 98, 100, 102, 104, all holding a respective work-piece except positions 102 and 104, which are shown as empty. A belt can be configured to hold as few or as many work-pieces as is suitable for a particular application. Also shown are four wheels 106 around which the conveyor 80 travels in circuitous fashion, under sufficient tension to maintain the preselected spacing 81. Any one or all of the wheels 106 may be powered for moving the conveyor 80. The wheels 106 can be toothed or non-toothed, and can be any of, for example, gears, cogs, pulleys, sprockets, and the like.

In operation, the conveyor 80 is moved in the direction of the arrows 108 the length of one position. In accordance with an example the present invention, the work-piece at position 90 is moved out of the magnetic field 12 with the assistance of the next-in-line work-piece 88, which is simultaneously moved into the magnetic field 12 for magnetic processing; the movement repeating as desired. Magnetic forces are offset as taught hereinabove. With reference to respective arrows 110, 112, new work-pieces are added to the conveyor 80 at position 82, while processed work-pieces are removed at position 100. In other examples of the present invention, work-pieces can be removed and replaced with new work-pieces at the same position.

Other processes may occur in sequence with magnetic processing. Pre-processing such as preheating, precooling, and/or analysis, represented by box 114, may occur at position 86. Post-processing such as heating, cooling, and/or analysis, represented by box 116, may occur at position 94.

Figure 10:
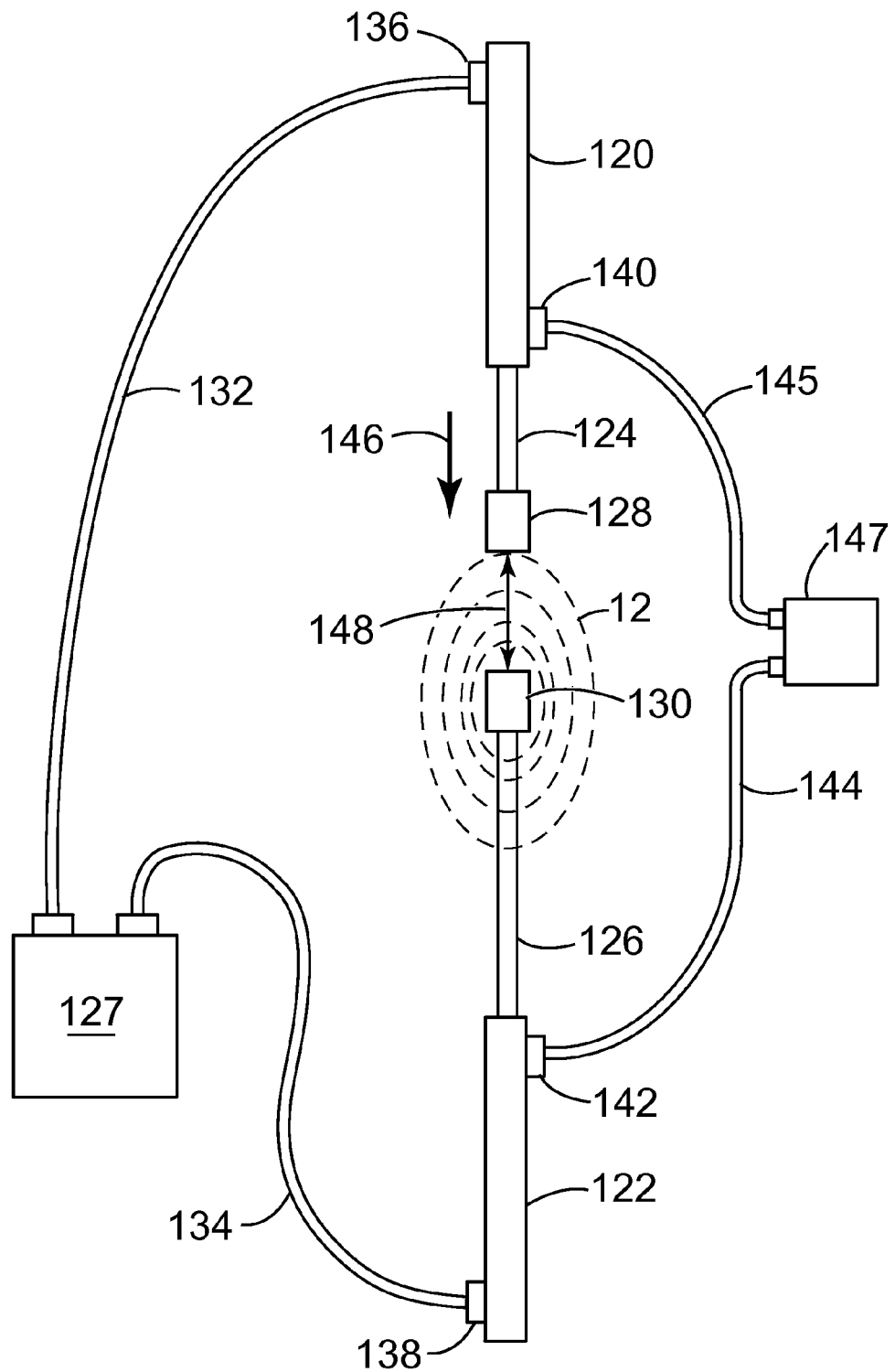
FIG. 10 is a schematic diagram of a carriage configured for hydraulically actuated reciprocal movement of work-pieces through a magnetic field in accordance with an example of the present invention.

FIG. 10 shows an example of the present invention configured for hydraulically actuated reciprocal movement of work-pieces in and out of a magnetic field 12 for magnetic processing. First and second double-acting hydraulic cylinders 120, 122 (also called linear hydraulic motors) have respective piston rods 124, 126 that are adapted to hold respective counter-work-piece 128 and work-piece 130. A hydraulic pump and control unit 127 has respective hydraulic lines 132, 134 to respective distal connections 136, 138 of the hydraulic cylinders 120, 122. Respective proximal connections 140, 142, are connected to each other by hydraulic equalization lines 144, 145, and an optional hydraulic controller 147, which can be simple valve and reservoir system that can be used to hydraulically adjust and/or maintain the spacing 148 of the work-pieces 128, 130.

In operation, the hydraulic pump and control unit 127 forces hydraulic fluid through the first hydraulic line 132, and into the first hydraulic cylinder 120, forcing the respective piston rod 124 to move the counter-work-piece 128 in the direction of the arrow 146. Hydraulic fluid is thus forced through the hydraulic equalization lines 144, 145, optional hydraulic controller 147, and into the second hydraulic cylinder, forcing the respective piston rod 126 to simultaneously move the work-piece 130 in the direction of the arrow 146. Magnetic forces are offset as taught hereinabove. Reciprocal action is accomplished by reversing the flow of hydraulic fluid.

EXAMPLE I

An example of the invention illustrated in FIGS. 1-3 was modeled computationally based on the saturated magnetic properties of low carbon steel and the gradient scale length of an existing 9 Tesla superconducting magnet with a 5 inch diameter warm bore. The net extraction force was calculated for a pair of transmission shafts, one acting as the work-piece and the other acting as the counter-work-piece. Multiple calculations were carried out with various spacing therebetween in accordance with examples of the present invention and compared with the extraction force on a single transmission shaft. Each theoretical work-piece had a volume of 60 cc, or 3.7 cubic inches. Results are shown in FIG. 11.

Figure 11:
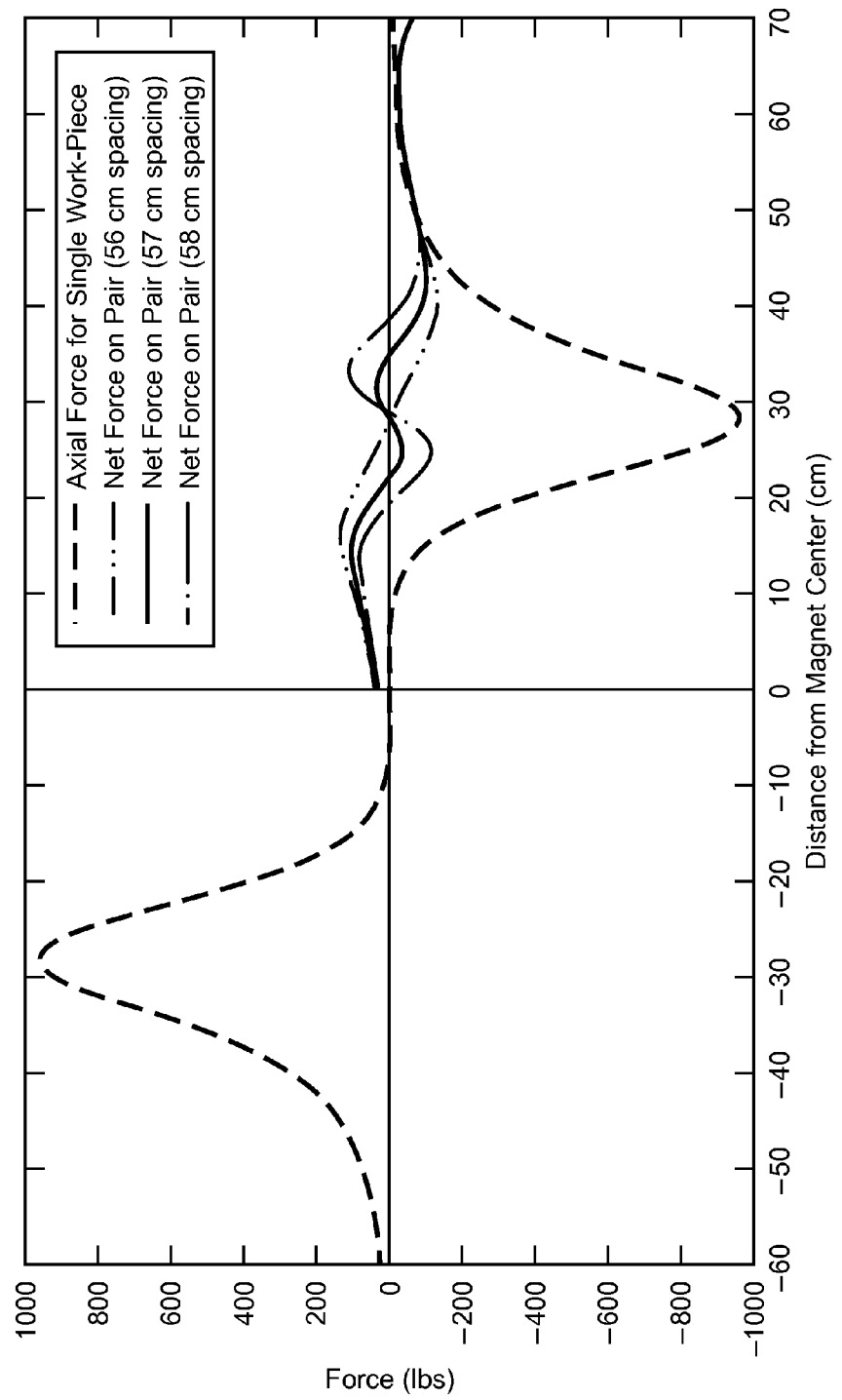
FIG. 11 is a graph showing net extraction force on a pair of transmission shafts, with various spacing in accordance with examples of the present invention, compared with the extraction force on a single transmission shaft.

It is noted that in FIG. 11 the force on a pair of work pieces does not go to zero when one work piece is at the center of the magnetic field where the field is uniform and force-free. That is because the counter work piece is still close enough to the magnetic field to be subjected to a non-negligible attractive force. Thus the net force on the pair remains finite when the work-piece is positioned at the center of the magnetic field. A solution to that residual force problem is shown in FIGS. 4-7 and corresponding description hereinabove, where the work-piece is moved farther away from the magnetic field, thus allowing force-free processing of the work piece at the center of the magnetic field.

EXAMPLE II

Figure 12:
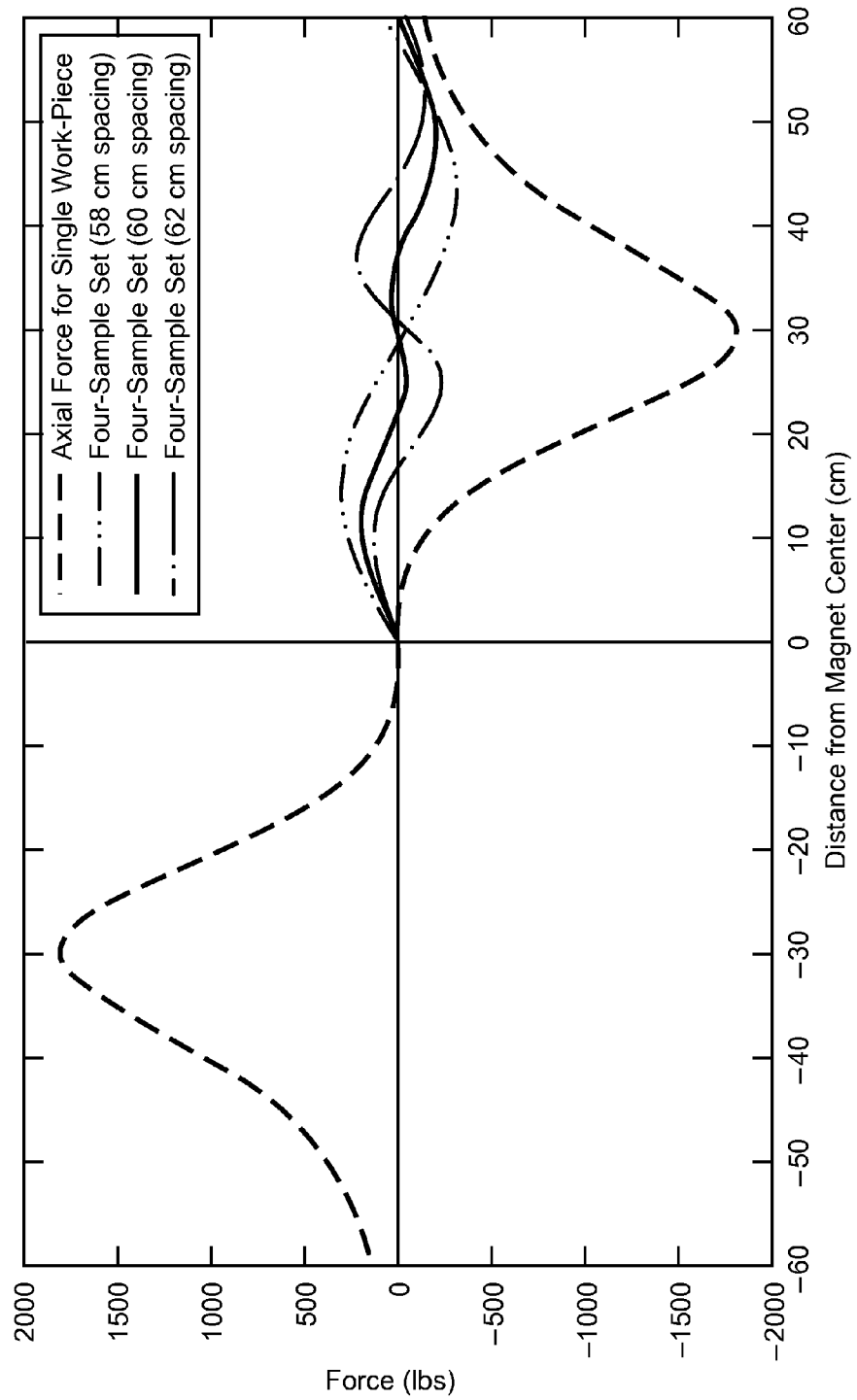
FIG. 12 is a graph showing net extraction force on a set of four uniformly spaced transmission shafts in accordance with examples of the present invention, compared with the extraction force on a single transmission shaft.

An example of the invention illustrated in FIG. 8 was modeled computationally based on the saturated magnetic properties of low carbon steel and the gradient scale length of an existing 9 Tesla superconducting magnet with an 8 inch diameter warm bore. The net extraction force on a set of four uniformly spaced transmission shafts was calculated for various spacing therebetween in accordance with examples of the present invention and compared with the extraction force on a single transmission shaft. For this case, each work-piece had a volume of 160 cc, or 9.8 cubic inches. Results are shown in FIG. 12.

The skilled artisan will recognize that the above examples illustrate merely few of the sundry possible configurations that can be employed in carrying out the present invention; many well-known mechanisms can be used alone or in combination. Examples of such mechanisms include, but are not limited to levers, pulleys, cables, winches, cranks, belts, gears, cogs, racks, pinions, chains, sprockets, cams, followers, shafts, sliding members, motors, engines, and various conventional devices for controlling the foregoing.

An important consideration in the carrying out of the present invention is that the magnet coil design (for example, a Bitter resistive magnet, superconducting magnet, or a hybrid magnet) should be such that the opposing magnetic gradients are generally symmetric so that the final force will indeed be cancelled out in an optimal near-zero-force condition. In cases where the magnetic field is not symmetric, opposing work-pieces can have corresponding asymmetry in order to cancel out opposing magnetic forces.

While there has been shown and described what are at present considered to be examples of the invention, it will be obvious to those skilled in the art that various changes and modifications can be prepared therein without departing from the scope of the inventions defined by the appended claims.

What is claimed is:

1. A carriage for high magnetic field environments comprising a first work-piece holding means for holding a first work-piece, said first work-piece holding means being disposed in an operable relationship with a work-piece processing magnet having a magnetic field strength of at least 1 Tesla, said first work-piece holding means further being disposed in operable connection with a second work-piece holding means for holding a second work-piece so that, as the first work-piece is inserted into said magnetic field, the second work-piece is simultaneously withdrawn from said magnetic field, so that an attractive magnetic force imparted on the first work-piece offsets a resistive magnetic force imparted on the second work-piece.

2. A carriage in accordance with claim 1 further comprising a traversing frame disposed in operable connection with said first work-piece holding means and said second work-piece holding means to maintain a preselected spacing between the first and second work-pieces.

3. A carriage in accordance with claim 2 wherein said traversing frame is disposed essentially outside the effective bounds of said magnetic field.

4. A carriage in accordance with claim 1 further comprising at least one hydraulic cylinder disposed in operable connection with said first work-piece holding means and said second work-piece holding means to maintain a preselected spacing between the first and second work-pieces.

5. A carriage in accordance with claim 4 wherein said hydraulic cylinder is disposed essentially outside the effective bounds of said magnetic field.

6. A dual stage carriage for high magnetic field environments comprising: a primary traversing frame disposed in an operable relationship with a work-piece processing magnet having a magnetic field strength of at least 1 Tesla, said primary traversing frame further disposed in operable connection with a first work-piece holding means for holding a first work-piece; and a secondary traversing frame supported by said primary traversing frame and disposed in operable connection to a second work-piece holding means for holding a second work-piece so that, with the second work-piece in said magnetic field, the first work-piece can be moved from a position essentially outside effective bounds of said magnetic field toward the second work-piece to a preselected spacing from the second work-piece, then, as said first work-piece holding means is inserted into said magnetic field, said second work-piece holding means is simultaneously withdrawn from said magnetic field, so that an attractive magnetic force imparted on the first work-piece offsets a resistive magnetic force imparted on the second work-piece, and then, with the first work-piece being within said magnetic field, the second work-piece can be moved from the preselected spacing from the first work-piece away from the first work-piece to a position essentially outside said effective bounds of said magnetic field.

7. A dual stage carriage in accordance with claim 6 wherein said primary traversing frame is disposed essentially outside said effective bounds of said magnetic field.

8. A dual stage carriage in accordance with claim 6 wherein said secondary traversing frame is disposed essentially outside said effective bounds of said magnetic field.

9. A method of moving work-pieces into and out of a high magnetic field environment comprising the steps of:
  a. providing a first work-piece holding means that is holding a first work-piece and a second work-piece holding means that is holding a second work-piece, said first work-piece holding means being disposed in operable connection with said second work-piece holding means;
  b. with said first work-piece holding means, holding said first work-piece disposed without a magnetic field having strength of at least 1 Tesla while, with second work-piece holding means, holding said second work-piece disposed within said magnetic field; and
  c. moving said first work-piece holding means and said second work-piece holding means to simultaneously insert said first work-piece into said magnetic field and withdraw said second work-piece from said magnetic field, so that an attractive magnetic force imparted on said first work-piece offsets a resistive magnetic force imparted on said second work-piece.

10. A method in accordance with claim 9 further comprising a traversing frame disposed in operable connection with said first work-piece holding means and said second work-piece holding means to maintain a preselected spacing between said first work-piece and second work-piece, and wherein said moving step comprises moving said traversing frame.

11. A method in accordance with claim 9 further comprising a at least one hydraulic cylinder disposed in operable connection with said first work-piece holding means and said second work-piece holding means to maintain a preselected spacing between said first work-piece and said second work-piece, and wherein said moving step comprises hydraulically actuating said at least one hydraulic cylinder.

12. A method of moving work-pieces into and out of a high magnetic field environment comprising the steps of:
  a. providing a primary traversing frame disposed in an operable relationship with a work-piece processing magnet having a magnetic field strength of at least 1 Tesla, said primary traversing frame further disposed in operable connection with a first work-piece holding means that is holding a first work-piece, and a secondary traversing frame supported by said primary traversing frame and disposed in operable connection to a second work-piece holding means that is holding a second work-piece;
  b. with said second work-piece in said magnetic field, moving said first work-piece from a position essentially outside effective bounds of said magnetic field toward said second work-piece to a preselected spacing from said second work-piece;
  c. as said first work-piece is inserted into said magnetic field, simultaneously withdrawing said second work-piece from said magnetic field while maintaining said preselected spacing, so that an attractive magnetic force imparted on said first work-piece offsets a resistive magnetic force imparted on said second work-piece; and
  d. with said first work-piece being within said magnetic field, moving said second work-piece from said preselected spacing from said first work-piece away from said first work-piece to a position essentially outside said effective bounds of said magnetic field.

* * * * *